US 6,676,713 B1

(12) United States Patent
Okada et al.

(10) Patent No.: US 6,676,713 B1
(45) Date of Patent: *Jan. 13, 2004

(54) PROCESS FOR PRODUCING ELECTRODE OF NONAQUEOUS ELECTROLYTE BATTERY

(75) Inventors: Mikio Okada, Kyoto (JP); Takeshi Hasumi, Kyoto (JP); Hideo Yasuda, Kyoto (JP)

(73) Assignee: Japan Storage Battery Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/131,675

(22) Filed: Aug. 10, 1998

(30) Foreign Application Priority Data

Aug. 8, 1997 (JP) ............................................. 9-227257
Aug. 8, 1997 (JP) ............................................. 9-227258
Nov. 18, 1997 (JP) ............................................. 9-335044

(51) Int. Cl.⁷ .......................... H01M 4/04; H01M 4/28; H01M 4/62
(52) U.S. Cl. ...................... 29/623.1; 429/212; 429/215; 429/231.8; 429/231.1
(58) Field of Search ............................. 29/623.1, 623.5; 429/231.8, 215, 218.1, 137, 212; 423/447.5

(56) References Cited

U.S. PATENT DOCUMENTS

| 4,710,335 A | * 12/1987 | Kita et al. ................... 264/105 |
| 5,558,954 A | * 9/1996 | Morrison |
| 5,738,691 A | * 4/1998 | Barker et al. ............... 29/623.1 |
| 5,811,205 A | * 9/1998 | Andrieu et al. .............. 429/137 |

FOREIGN PATENT DOCUMENTS

| EP | 0 730 316 A | * 9/1996 | ............ H01M/6/18 |
| WO | WO 9620504 | 7/1996 | |

* cited by examiner

*Primary Examiner*—Patrick Ryan
*Assistant Examiner*—Tracy Dove
(74) *Attorney, Agent, or Firm*—Sughrue Mion, PLLC (57) ABSTRACT

In a process for producing an electrode of a nonaqueous electrolyte battery, an electrode and a polymer paste are prepared. The electrode is made of a metal as a current collector and an active material layer thereon. The polymer paste has a polymer dissolved in a solvent soluble in water. The polymer paste is allowed to be held in the electrode. Thereafter, the solvent is extracted from the polymer paste with an aqueous solution containing an alcohol, phosphorous or phosphorous compound.

10 Claims, 4 Drawing Sheets

PROCESS FOR PRODUCING ELECTRODE OF NONAQUEOUS ELECTROLYTE BATTERY

BACKGROUND OF THE INVENTION

1. Field of the Invention

The present invention relates to a process for producing an electrode for a nonaqueous electrolyte battery.

2. Description of the Related Art

A battery comprising a nonaqueous electrolyte solution and a negative electrode made of an alkaline metal can form a high voltage battery providing a voltage as high as not lower than 3 V and thus can serve as a high energy density battery. However, such a battery, if it serves as a secondary battery, is disadvantageous in that it is liable to shortcircuiting due to the deposition of dendrite of alkaline metal during charging and thus has a reduced endurance. Further, since an alkaline metal has a high reactivity, such a battery can be hardly provided with a sufficient safety. In order to overcome these difficulties for lithium battery for example, a so-called lithium ion battery has been devised which comprises a carbon-based negative electrode made of graphite or carbon on which dendrite of metallic lithium can hardly be deposited instead of metallic lithium and a positive electrode made of lithium cobaltate or lithium nickelate. This lithium ion battery has been used as a high energy density battery.

In order to improve the safety of a nonaqueous electrolyte battery, it is important to reduce the amount of free electrolyte solution present in the vicinity of the positive active material and the negative active material. Accordingly, the filling of pores in the positive active material layer and the negative active material layer with a solid electrolyte instead of free electrolyte solution is extremely effective for the improvement of the safety of the battery.

However, in a nonaqueous electrolyte battery such as lithium battery and lithium ion battery, the majority of lithium ions taking part in the electrode reaction in the charge-discharge reaction are not those dissolved in the electrolyte originally. Lithium ions released from the active material move through the electrolyte and then reach the opposite electrode. Thus, the movement distance of lithium ion is long. Further, the transport number of lithium ion in the electrolyte of a nonaqueous electrolyte battery at room temperature is normally not more than 0.5 while the transport number of proton and oxyhydroxide ion in the aqueous battery is close to 1. In a lithium battery and a lithium ion battery, the movement rate of ion in the electrolyte is governed by the diffusion of ion. Accordingly, if the pores in the electrode are filled with solid electrolyte instead of electrolyte solution, the diffusion rate of ion in the electrolyte is very low, deteriorating the high rate charge-discharge properties of the battery. Thus, practical battery properties cannot be obtained.

In order to overcome these difficulties, an attempt has been made to improve the high rate charge-discharge properties of batteries by filling the pores in the electrode with porous polymer electrolyte so that ions can be rapidly diffused through the free electrolyte solution in the pores. In this arrangement, the amount of free electrolyte solution can be reduced as much as the pores in the electrode are filled with porous polymer, providing a battery having a higher safety than the conventional batteries free of polymer electrolyte. Further, since ions can be diffused rapidly into the pores in the polymer electrolyte, sufficient battery properties can be obtained (U.S. patent application Ser. No. 08/637,600).

The polymer electrolyte to be filled in the pores in the electrode needs to be elastic enough to deform according to the volumetric expansion and shrinkage of the active material during charging and discharging. Thus, the porous polymer electrolyte is preferably a polymer gel obtained by allowing a polymer to swell with an electrolyte solution. An optimum process for the preparation of the porous polymer is a solvent extraction method which allows the formation of continuous pores consisting of uniform spherical pores (U.S. Pat. No. 4,539,256). The solvent extraction method is a method for the preparation of porous polymer which comprises immersing polymer paste in a second solvent insoluble in the polymer soluble in the solvent for the polymer paste so that the solvent for the polymer paste is extracted to form pores and the polymer is solidified. In the solvent extraction method, as the second solvent in which the polymer paste is immersed water, which exhibits a strong polarity, a good solubility in many polymers and an insolubility in many high molecular compounds and is inexpensive, is most suitable. In a nonaqueous electrolyte battery, it is undesirable that water enters in the battery. However, a battery having little water content and good properties can be prepared by a process which comprises immersing an electrode in water, sufficiently drying the electrode, inserting the electrode into a battery case, and then injecting an electrolyte solution into the battery so that the polymer is allowed to swell to form a porous polymer. In a nonaqueous electrolyte battery such as lithium ion battery, as a current collector there may be used a metal. However, many metals corrode with water having an excellent electronic conductivity. Thus, when such an electrode is immersed in water, the current collector exhibits a remarkably deteriorated electronic conductivity on the surface thereof. Accordingly, such a battery is disadvantageous in that the deterioration of the current collector properties causes deterioration of the battery properties. Thus, as the current collector there cannot be substantially used a metal such as aluminum and copper.

SUMMARY OF THE INVENTION

The present invention has been worked in the light of the foregoing problems. It is an object of the present invention to inhibit the corrosion of a current collector by water and hence inhibit the deterioration of the battery properties due to the deterioration of the properties of the current collector even if the current collector is made of a metal and the electrode provided with the porous polymer is prepared by immersing an electrode having the polymer paste held therein in water.

According to the first aspect of the present invention, a process for producing an electrode of a nonaqueous electrolyte battery, is comprised of the steps of: preparing an electrode comprising a metal as a current collector and having an active material layer; preparing a polymer paste having a polymer dissolved in a solvent soluble in water; allowing the polymer paste to be held in the electrode; and extracting the solvent from the polymer paste with an aqueous solution containing an alcohol, phosphorus or phosphorus compound.

According to the second aspect of the present invention, in the process according to the first aspect, the aqueous solution containing a phosphorus compound is an aqueous solution of phosphoric acid or phosphate.

According to the third aspect of the present invention, in the process according to the first and second aspects, the concentration of phosphorus or phosphorus compound in the aqueous solution is from $1 \times 10^{-7}$ to 1 mol/l.

According to the fourth aspect of the present invention, in the process according to the first aspect, the concentration of alcohol in the aqueous solution is from 1 to 70% by weight.

According to the fifth aspect of the present invention, in the process according to the first and fourth aspect of the present invention, the alcohol is ethanol or methanol.

According to the sixth aspect of the present invention, in the process according to any one of the first to fifth aspects, the metallic collector is made of aluminum or copper.

DETAILED DESCRIPTION OF THE INVENTION

The present invention will be further described with reference to electrode used in lithium secondary battery as an embodiment.

An electrode for a nonaqueous electrolyte battery is produced by preparing an electrode made of a metal as a current collector and having an active material layer and a polymer paste having a polymer dissolved in a solvent soluble in water, allowing said polymer paste to be held in the electrode, and then extracting the solvent from the polymer paste with an aqueous solution containing an alcohol, phosphorus or phosphorus compound.

The foregoing production process will be further described hereinafter. Firstly, an active material layer is formed on a metallic current collector. The active material layer includes an active material, a binder and a solvent. It may includes an electro-conducting additives incorporated therein. The active material layer thus formed is then dried to form a porous active material layer. The reason why the active material layer is rendered porous is that the solvent can be easily evaporated. Subsequently, a polymer paste having a polymer dissolved in a solvent soluble in water is applied to the surface of the active material layer. Alternatively, the active material layer is immersed in the polymer paste. In this manner, the polymer paste is allowed to penetrate into the pores in the active material layer. Thereafter, the solvent is extracted from the polymer paste with water to form a porous polymer in the pores in the active material layer or in the active material layer and on the surface area of the electrode. When a polymer which swells in an electrolyte solution is used as the porous polymer, if the foregoing electrode and electrolyte solution are used to prepare a battery, the porous polymer acts as a porous polymer electrolyte. If the foregoing method (U.S. patent application Ser. No. 08/637,600) is used to prepare an electrode having a porous solid electrolyte, a problem arises that when the electrode is immersed in water during the solvent extraction method by which a porous polymer is prepared in the pores in the electrode or in the pores in the electrode and on the surface of the electrode, the metal constituting the current collector corrodes, remarkably reducing the electronic conductivity. Further, the resulting deterioration of the current collector properties causes deterioration of the battery properties. In the present invention, the current collector is made of a metal, and the electrode holding a polymer paste having a polymer dissolved in a solvent soluble in water is treated with water containing an alcohol, phosphorus or phosphorus compound so that the solvent for polymer paste is extracted to produce an electrode provided with a porous polymer. In the present invention, it was experimentally confirmed that even if an electrode constituted by a current collector made of a metal is immersed in an aqueous solution, the deterioration of the current collector properties due to the corrosion of metal by water can be remarkably inhibited.

The reason why the use of an aqueous solution containing phosphorus or phosphorus compound makes it possible to inhibit the corrosion of the current collector is presumably that phosphorus or phosphorus compound reacts with the current collector to form a phosphorus compound film on the surface thereof. The reason why the use of an alcohol makes it possible to inhibit the corrosion of the current collector is presumably that the presence of an alcohol allows water molecules to be rapidly removed from the electrode during drying after solvent extraction, making it possible to inhibit the progress of the formation of oxide layer at high temperatures. Accordingly, the use of the present invention prevents the deterioration of the current collector properties due to the corrosion of the current collector, making it possible to obtain sufficient battery properties, even if an electrode provided with a porous polymer is prepared by a solvent extraction method which involves immersing an electrode in water. Since water, which is inexpensive, can be used as the solvent in which the electrode is immersed in the solvent extraction method, the production cost of the electrode can be reduced as compared with the case where other solvents are used.

Further, if the active material contains an alkaline metal, the corrosion of the metallic current collector can be easily accelerated. The acceleration of the corrosion of the metallic current collector is remarkable particularly when the alkaline component is dissolved from the active material in water. The effect of the present invention is remarkable particularly when the active material is a composite oxide, oxide having tunnel-like pores or lamellar metal chalcogenide represented by the composition formula $Li_xMO_2$ or $Li_yM_2O_4$ (in which M represents a transition metal, x represents a number of from more than 0 to not more than 1, and y represents a number of from more than 0 to not more than 2), from which impurities come out. Thus, the rise in the resistivity of the electrode can be inhibited.

As the solvent for the polymer paste soluble in water, there may be preferably used an aprotic protophilic solvent, more preferably n-methyl-2-pyrrolidone, dimethylformamide or dimethyl sulfoxide.

EXAMPLES

The present invention will be further described in the following preferred examples.

Example 1

Firstly, an example using an aqueous solution of phosphoric acid as an aqueous solution containing a phosphorus compound for solvent extraction will be described. A non-aqueous electrolyte battery was prepared according to the following procedure.

The process for the preparation of a positive electrode will be described hereinafter. A mixture of 70 wt % of lithium cobaltate, 6 wt % of acetylene black, 9 wt % of a polyvinylidene fluoride (PVdF) and 15 wt % of n-methyl pyrrolidone (NMP) was applied to an aluminum foil having a width of 100 mm, a length of 480 mm and a thickness of 20 $\mu$m, and then dried at a temperature of 150° C. to evaporate NMP. This procedure was effected on both sides of the aluminum foil to prepare a positive electrode having an active material layer formed on both sides thereof. The positive electrode thus prepared was then subjected to the following treatment to prepare two kinds of positive electrodes (A) and (B).

A polymer paste obtained by dissolving 4 wt % of PVdF in 96 wt % of NMP was applied to both sides of one of the two electrodes, and then allowed to stand for 5 minutes so that it penetrated into the pores in the active material layer. The electrode was then passed through the gap between rollers to remove the polymer paste which had not penetrated into the electrode but had been attached to the electrode. The positive electrode was then subjected to solvent extraction method which includes immersing it in an aqueous solution of $1\times10^{-3}$ mol/l phosphoric acid so that NMP in the polymer paste is replaced by water. In this manner, PVdF in the pores in the electrode was provided with continuous pores. PVdF was then solidified. The electrode was dried at a temperature of 100° C. for 30 minutes to remove water therefrom, and then pressed to reduce its thickness from 280 $\mu$m to 175 $\mu$m. The electrode thus treated was then cut into a size of 19 mm wide×480 mm long. Thus, the electrode (A) was prepared.

On the other hand, the polymer paste was not applied to the other of the two positive electrodes. The electrode was pressed to reduce its thickness from 280 $\mu$m to 175 $\mu$m. The electrode was then cut into a size of 19 mm wide×480 mm long. Thus, the electrode (B) was prepared.

The process for the preparation of a negative electrode will be described hereinafter. An active material paste obtained by mixing 81 wt % of graphite, 9 wt % of PVdF and 10 wt % of NMP was applied to a copper foil having a width of 80 mm, a length of 500 mm and a thickness of 14 $\mu$m, and then dried at a temperature of 150° C. to evaporate NMP. This procedure was effected on both sides of the copper foil to prepare a negative electrode provided with an active material layer on both sides thereof. The negative electrode thus prepared was then subjected to the following treatment to prepare two kinds of negative electrodes (C) and (D).

A polymer paste obtained by dissolving 4 wt % of PVdF in 96 wt % of NMP was applied to both sides of one of the two electrodes, and then allowed to stand for 5 minutes so that it penetrated into the pores in the active material layer. The electrode was then passed through the gap between rollers to remove the polymer paste which had not penetrated into the electrode but had been attached to the electrode. The negative electrode was then subjected to solvent extraction method which includes immersing it in an aqueous solution of $1\times10^{-3}$ mol/l phosphoric acid so that NMP in the polymer paste is replaced by water. In this manner, PVdF in the pores in the electrode was provided with continuous pores. PVdF was then solidified. The electrode was dried at a temperature of 100° C. for 30 minutes to remove water therefrom, and then pressed to reduce its thickness from 300 $\mu$m to 190 $\mu$m. The electrode thus treated was then cut into a size of 20 mm wide×500 mm long. Thus, the electrode (C) was prepared.

On the other hand, the polymer paste was not applied to the other of the two negative electrodes. The electrode was pressed to reduce its thickness from 300 $\mu$m to 190 $\mu$m. The electrode was then cut into a size of 20 mm wide×500 mm long. Thus, the electrode (D) was prepared.

These positive and negative electrodes were wound with a polyethylene separator having a thickness of 30 $\mu$m and a width of 22 mm provided interposed therebetween, and then inserted into a stainless steel case having a height of 47.0 mm, a width of 22.2 mm and a thickness of 6.4 mm. Into the stainless steel case was then injected an electrolyte solution obtained by adding 1 mol/l of $LiPF_6$ to a 1:1 (by volume) mixture of ethylene carbonate and dimethyl carbonate to prepare batteries (E) and (F) of the present invention having a nominal capacity of 400 mAh. The battery (E) was made of the positive electrode (A) and the negative electrode (D). The battery (F) was made of the positive electrode (B) and the negative electrode (C). The battery was provided with an irrecoverable safety valve.

A comparative battery (G) was prepared in the same manner as the battery (E) except that the positive electrode was immersed in purified water free of phosphoric acid. A comparative battery (H) was prepared in the same manner as the battery (F) except that the negative electrode was immersed in purified water free of phosphoric acid.

Figure 1:
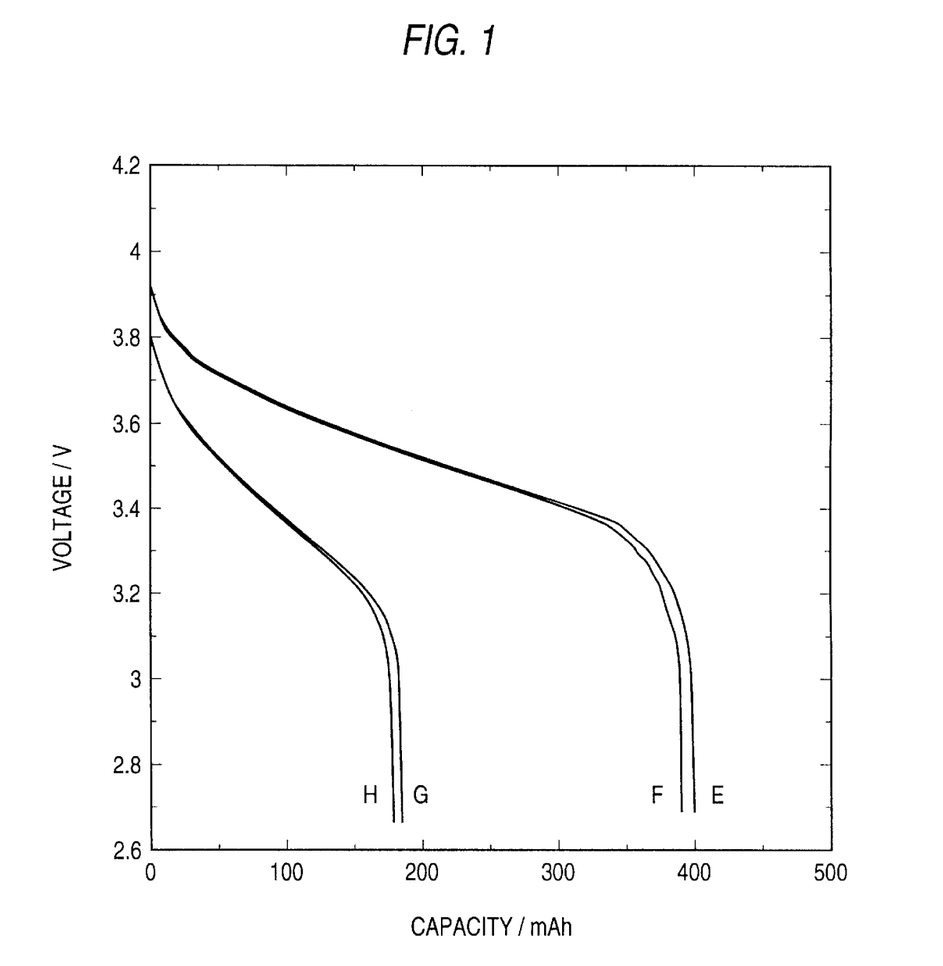
FIG. 1 is a graph illustrating the high rate discharge properties of the batteries (E) and (F) comprising electrodes according to the present invention of Example 1 and the comparative batteries (G) and (H)

The batteries (E), (F), (G) and (H) thus prepared were then subjected to the following charge-discharge test. The batteries were each charged at a constant current of 400 mA to 4.1 V where it was then charged for 2 hours, allowed to stand for 10 minutes, and then discharged at a constant current of 800 mA to 2.75 V. The charge-discharge properties of these batteries are shown in FIG. 1. FIG. 1 shows that the batteries (E) and (F) of the present invention exhibit far better high rate discharge properties than the comparative batteries (G) and (H).

These results are attributed to the fact that the battery (E) is less liable to corrosion of current collector and exhibits better current collector properties than the comparative battery (G).

This is presumably because that when the positive electrode is immersed in an aqueous solution of phosphoric acid during the preparation of the battery (E), phosphoric acid forms a phosphorus compound film on the surface of aluminum, making it possible to inhibit the corrosion of aluminum by water.

These results are also attributed to the fact that the battery (F) is less liable to corrosion of copper constituting the negative electrode and exhibits better negative electrode current collector properties than the comparative battery (H).

This is presumably because that when the negative electrode is immersed in an aqueous solution of phosphoric acid during the preparation of the battery (F), phosphoric acid forms a phosphorus compound film on the surface of copper, making it possible to inhibit the corrosion of copper by water.

Example 2

Figure 2:
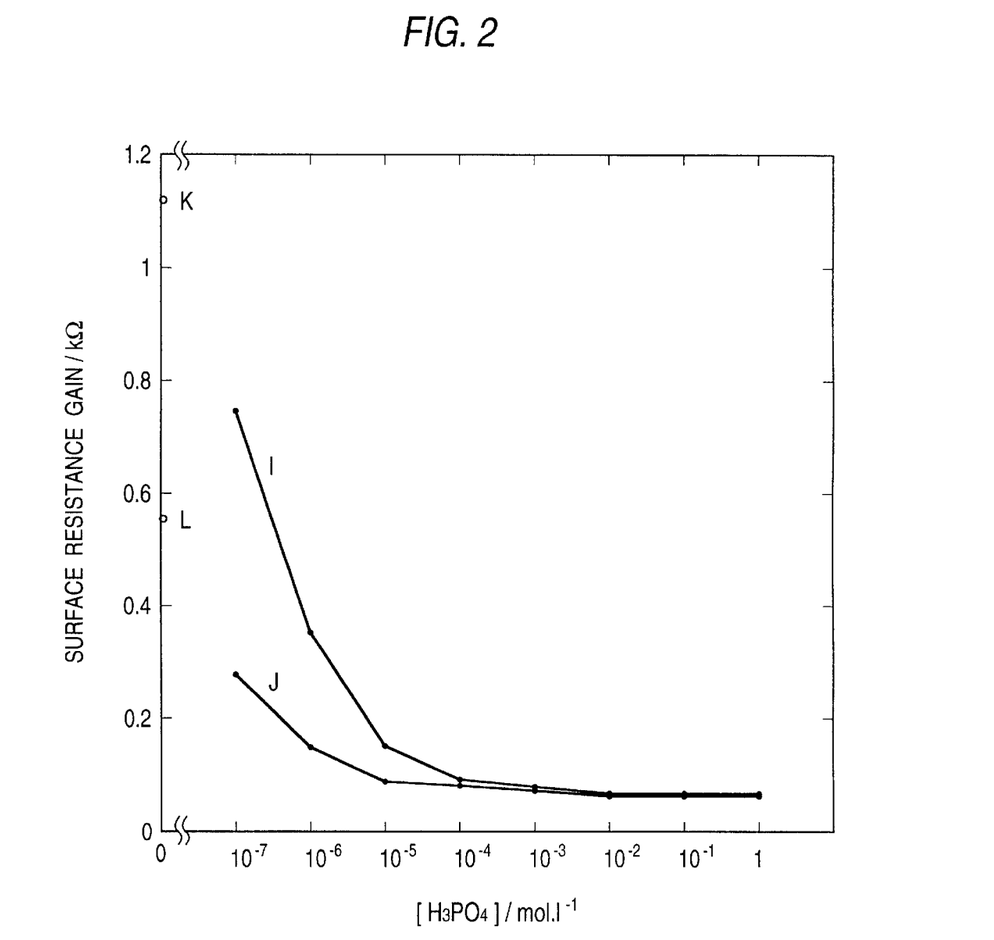
FIG. 2 is a graph illustrating the relationship between the concentration of phosphoric acid and the rise in the surface resistance of the positive electrode (I) and negative electrode (J) of the present invention of Example 2 and the comparative positive electrode (K) and negative electrode (L) which have been subjected to solvent extraction.

In order to study the effect of the present invention in detail, a positive electrode (I) and negative electrode (J) of the present invention were prepared. The positive electrode (I) was prepared in the same manner as the positive electrode (A) except that the concentration of phosphoric acid in the aqueous solution was changed. The negative electrode (J) was prepared in the same manner as the negative electrode (C) except that the concentration of phosphoric acid in the aqueous solution was changed. Further, comparative positive electrode (K) and negative electrode (L) were prepared in the same manner as the positive electrode (I) and negative electrode (J), respectively, except that the electrode coated with a polymer paste was immersed in purified water free of phosphoric acid. These electrodes were then measured for surface resistance. For the measurement of surface resistance, MCP-TESTER LORESTA-FP produced by Mitsubishi Petrochemical Co., Ltd. was used. In the measurement of surface resistance, two probes having a diameter of 2 mm were pressed against one surface of the electrode under a predetermined pressure at an interval of 8 mm. Under these conditions, the surface resistance between the two probes was measured. In the electrode, the current collector exhibits a far higher electronic conductivity than the active material layer. Thus, in this method, the resistance between the surface of the electrode and the current collector is actually measured, making it possible to detect the rise in the surface resistance of the current collector. The measurement of the surface resistance of the electrode was effected before the application of the polymer paste having PVdF dissolved in NMP to the electrode and after the 100° C.—30 min. drying of the electrode thus coated which had been immersed in water. The difference in this value is shown in FIG. 2 as a rise in the surface resistance. These results show that the positive electrode (I) and negative electrode (J) of the present invention are remarkably less liable to corrosion of current collector and exhibit better current collector properties than the comparative positive electrode (K) and negative electrode (L). This is presumably because when the electrode is immersed in an aqueous solution of phosphoric acid, phosphoric acid forms a phosphorus compound film on the surface of aluminum and copper, making it possible to inhibit the corrosion of the current collector by water.

These results show that even if the concentration of phosphoric acid is as extremely low as $10^{-7}$ mol/l, it can exert a great effect of inhibiting the corrosion of aluminum and copper. Even if the concentration of phosphoric acid is high, similar effect can be exerted. However, it is useless to raise the concentration of phosphoric acid beyond necessary taking into account economy. Thus, 1 mol/l is enough.

Example 3

Positive and negative electrodes of the present invention were prepared in the same manner as in Example 1 except that various phosphorus compounds were used instead of phosphoric acid. These electrodes were then measured for surface resistance in the same manner as in Example 2. The results are set forth in Table 1.

TABLE 1

| Phosphorus or phosphorus compound | Concentration of phosphorus compound in water (mol/l) | Rise in surface resistance of positive electrode/KΩ | Rise in surface resistance of negative electrode/KΩ |
|---|---|---|---|
| None (purified water) | 0 | 1.13 | 0.566 |
| White phosphorus | $1 \times 10^{-6}$ | 0.42 | 0.23 |
| $Al(H_2PO_4)_3$ | $1 \times 10^{-3}$ | 0.132 | 0.126 |
| $Ca_{3(PO4)2}$ | $5 \times 10^{-6}$ | 0.232 | 0.24 |
| $Ca(H_2PO_4)_2$ | $1 \times 10^{-3}$ | 0.132 | 0.128 |
| $H_3PO_4$ | $1 \times 10^{-3}$ | 0.134 | 0.126 |
| $K_2HPO_4$ | $1 \times 10^{-3}$ | 0.12 | 0.13 |
| $K_3PO_4$ | $1 \times 10^{-3}$ | 0.13 | 0.132 |
| $KH_2PO_4$ | $1 \times 10^{-3}$ | 0.13 | 0.126 |
| $Li_3PO_4$ | $1 \times 10^{-4}$ | 0.15 | 0.148 |
| $LiH_2PO_4$ | $1 \times 10^{-3}$ | 0.13 | 0.13 |
| $Mg_{3(PO4)2}$ | $1 \times 10^{-5}$ | 0.154 | 0.174 |
| $Mg(NH_4)PO_4$ | $1 \times 10^{-3}$ | 0.134 | 0.126 |
| $MgHPO_4$ | $1 \times 10^{-3}$ | 0.136 | 0.132 |
| $Mg(H_2PO_4)$ | $1 \times 10^{-3}$ | 0.13 | 0.13 |
| $Mn(H_2PO_4)_2$ | $1 \times 10^{-4}$ | 0.128 | 0.124 |
| $MnH_3(PO_4)_2$ | $1 \times 10^{-3}$ | 0.13 | 0.132 |
| $N_2H_5H_2PO_4$ | $1 \times 10^{-3}$ | 0.132 | 0.128 |
| $Na_3PO_4$ | $1 \times 10^{-3}$ | 0.132 | 0.13 |
| $Na_2HPO_4$ | $1 \times 10^{-3}$ | 0.136 | 0.132 |
| $Na_3PO_4NaF$ | $1 \times 10^{-3}$ | 0.13 | 0.134 |
| $NaH_2PO_4$ | $1 \times 10^{-3}$ | 0.134 | 0.128 |
| $NaNH_4HPO_4$ | $1 \times 10^{-3}$ | 0.13 | 0.132 |
| $(NH_4)_2HPO_4$ | $1 \times 10^{-3}$ | 0.132 | 0.128 |
| $NH_4H_2PO_4$ | $1 \times 10^{-3}$ | 0.13 | 0.13 |
| $PO(OCH_3)_3$ | $1 \times 10^{-3}$ | 0.132 | 0.13 |
| $Sr(H_2PO_4)_2$ | $1 \times 10^{-5}$ | 0.152 | 0.168 |
| $HPO_3$ | $1 \times 10^{-3}$ | 0.13 | 0.128 |
| $(NaPO_3)_3$ | $1 \times 10^{-3}$ | 0.13 | 0.126 |
| $MnP_4O_{12}$ | $1 \times 10^{-3}$ | 0.132 | 0.13 |
| $Na_2P_3O_{10}$ | $1 \times 10^{-3}$ | 0.13 | 0.132 |
| $(NH_4)_4P_2O_6$ | $1 \times 10^{-3}$ | 0.128 | 0.13 |
| $Na_3HP_2O_6$ | $1 \times 10^{-3}$ | 0.134 | 0.134 |
| $Na_2H_2P_2O_6$ | $1 \times 10^{-3}$ | 0.132 | 0.13 |
| $Na_4P_2O_6$ | $1 \times 10^{-3}$ | 0.13 | 0.128 |
| $(N_2H_5)_2H_2P_2O_6$ | $1 \times 10^{-3}$ | 0.144 | 0.182 |
| $(N_2H_5)H_3P_2O_6$ | $1 \times 10^{-5}$ | 0.128 | 0.126 |
| $H_4P_2O_7$ | $1 \times 10^{-3}$ | 0.13 | 0.128 |
| $(NH_4)_4P_2O_7$ | $1 \times 10^{-5}$ | 0.162 | 0.17 |
| $K_4P_2O_7$ | $1 \times 10^{-3}$ | 0.13 | 0.13 |
| $K_2H_2P_2O_7$ | $1 \times 10^{-5}$ | 0.15 | 0.172 |
| $Na_2H_2P_2O_7$ | $1 \times 10^{-3}$ | 0.13 | 0.132 |
| $Fe_2(P_2O_7)_3$ | $1 \times 10^{-5}$ | 0.152 | 0.168 |
| $Na_4P_2O_7$ | $1 \times 10^{-3}$ | 0.13 | 0.132 |
| $MnH_2P_2O_7 \cdot 4H_2O$ | $1 \times 10^{-5}$ | 0.156 | 0.164 |

Example 4

An example using methanol as an alcohol to be added to water for solvent extraction and aluminum as a metallic current collector will be described hereinafter.

Figure 3:
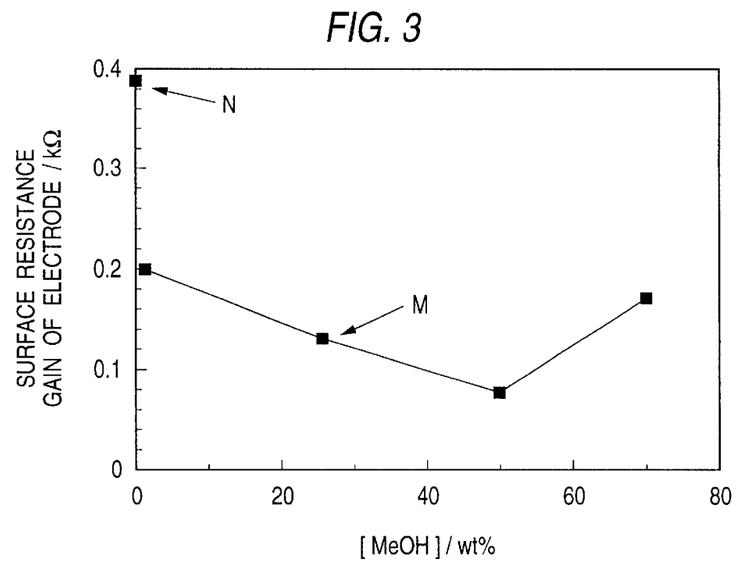
FIG. 3 is a characteristic curve illustrating the concentration of methanol and the rise in the surface resistance of the positive electrode (M) of the present invention of Example 4 and the comparative positive electrode (N)
Figure 4:
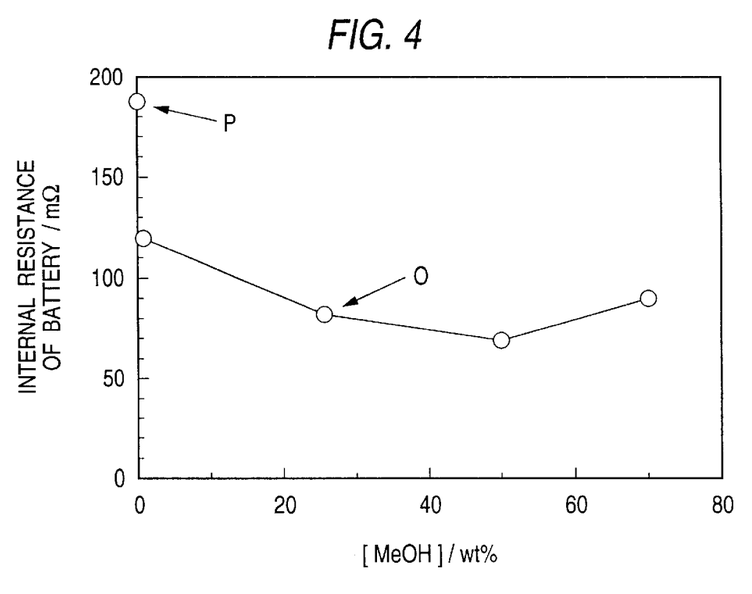
FIG. 4 is a characteristic curve illustrating the relationship between the concentration of methanol and the internal resistance of the battery (O) comprising an electrode of the present invention of Example 5 and the comparative battery (P) before and after heating.

A mixture of 70 wt % of lithium cobaltate, 6 wt % of acetylene black and 15 wt % of n-methyl pyrrolidone (NMP) having 9 wt % of a polyvinylidene fluoride (PVdF) dissolved therein was applied to an aluminum foil having a width of 20 mm, a length of 480 mm and a thickness of 20 μm, and then dried at a temperature of 90° C. to evaporate NMP. This procedure was effected on both sides of the aluminum foil to prepare an electrode. A polymer paste having 4 wt % of PVdF in NMP was then applied to the main body of the electrode thus prepared so that the polymer paste penetrated into the pores in the active material layer. Thereafter, the electrode was immersed in water containing from 1 to 70 wt % of methanol to effect solvent extraction. The electrode thus treated was withdrawn, and then dried at a temperature of 130° C. The electrode was then pressed to provide a positive electrode (M). The thickness of the positive electrode thus obtained was 170 μm. The weight of the active material and electro-conducting additives filled per unit area was 23 $\mu g/cm^2$. For comparison, a positive electrode (N) was prepared in the same manner as the positive electrode (M) except that as the solvent for extraction of NMP there was used water free of alcohol. The results of the measurement of surface resistance of these porous polymer-containing positive electrodes are shown in FIG. 3. These results show that the positive electrode (M) of the present invention, which has been obtained by extraction of NMP with water containing methanol, exhibits a lower surface resistance than the positive electrode (N), which has been obtained by extraction of NMP with water. FIG. 4 shows that the concentration of methanol, if any, is preferably from 1 to 70 wt %, more preferably from 30 to 60 wt %.

Similar results were obtained also when ethanol was used instead of methanol.

The reason why methanol or ethanol inhibits the rise in the surface resistance of the electrode is presumably that if an alcohol having a low boiling point is present at the step of drying the electrode from which the solvent has been extracted, drying can rapidly proceed, making it possible to inhibit the corrosion of the electrode.

Example 5

A battery prepared from the foregoing positive electrode (M) will be described hereinafter.

A negative electrode was prepared as follows. A mixture of 81 wt % of graphite, 9 wt % of PVdF and 10 wt % of NMP was applied to a copper foil having a thickness of 14 $\mu$m, and then dried at a temperature of 150° C. to evaporate NMP. This procedure was effected on both sides of the copper foil. The copper foil was then pressed to prepare a negative electrode. The thickness of the negative electrode thus obtained was 190 $\mu$m.

The positive electrode (M) and the negative electrode were wound with a microporous polypropylene separator having a thickness of 26 $\mu$m (trade name: Celgard) provided interposed therebetween, and then inserted into a stainless steel case having a height of 47.0 mm, a width of 22.2 mm and a thickness of 6.4 mm to form a prismatic battery. Thereafter, 2.5 g of an electrolyte solution composed of a 1:1 (by volume) mixture of ethylene carbonate containing 1 M of $LiPF_6$ and diethyl carbonate was injected into the stainless steel case. The battery was then heated at a temperature of 60° C. for 48 hours to prepare a battery (O) of the present invention having a nominal capacity of 400 mAh. For comparison, a battery (P) was prepared in the same manner as mentioned above except that the positive electrode (N) was used. FIG. 4 shows the results of the measurement of internal resistance of the batteries thus heated. These results show that the battery (O) of the present invention, which has been obtained by extraction of NMP with water containing methanol, exhibits a lower internal resistance than the comparative battery (P), which has been obtained by extraction of NMP with water.

Example 6

The discharge properties of the foregoing batteries will be described hereinafter.

Figure 5:
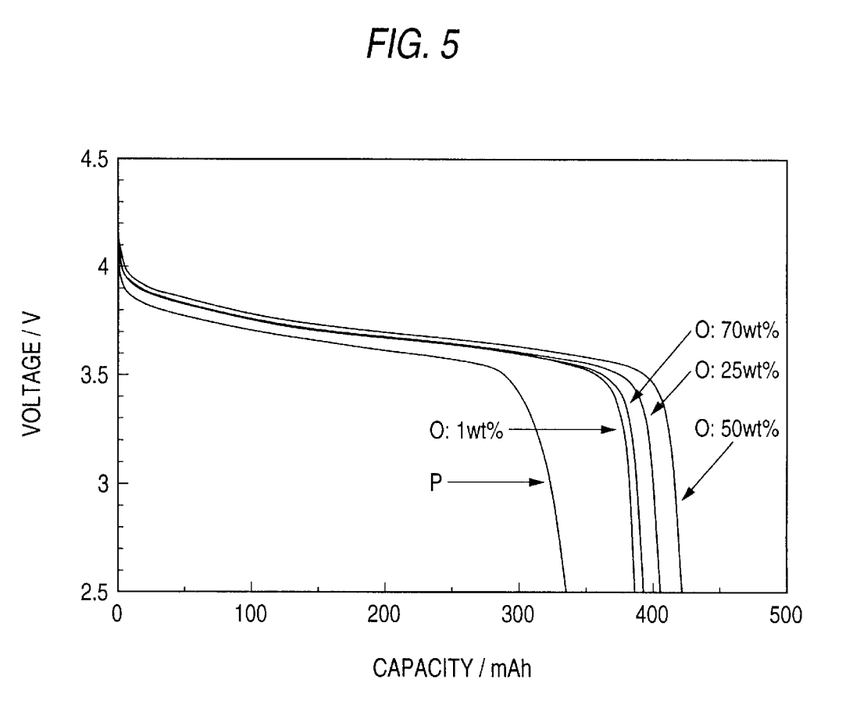
FIG. 5 is a graph curve illustrating the discharge curve of the battery (O) comprising the electrode of Example 6 and the comparative battery (P) which have been charged to 4.1 V.

At room temperature, the foregoing battery (O) of the present invention and the comparative battery (P) were each charged at a constant current of 1 A to 4.1 V where it was then charged for 2 hours, and then discharged at a constant current of 1 A to 2.5 V. The results of the discharge test are set forth in FIG. 5. These results show that the battery (O) of the present invention exhibits better discharge properties than the comparative battery (P), which has been obtained by extraction of NMP with water.

These results show that the battery prepared according to the present invention can give solution to the problems with the conventional batteries obtained by extraction with water and thus exhibits excellent properties.

In the foregoing examples, as the polymer to be packed in the pores in the electrode there was used a polyvinylidene fluoride. Alternatively, other various polymers may be used singly or in admixture. Examples of these polymers include polyether such as polyethylene oxide and polypropylene oxide, polyacrylonitrile, polyvinyl fluoride, polyvinylidiene chloride, polymethyl methacrylate, polymethyl acrylate, polyvinyl alcohol, polymethacrylonitrile, polyvinyl acetate, polyvinyl pyrrolidone, polyethyleneimine, polybutadiene, polystyrene, polyisoprene, and derivatives thereof. Polymers obtained by copolymerization of various monomers constituting the foregoing polymers may be used.

In the batteries (E), (F) and (O) of the present invention, as the nonaqueous electrolyte solution there was used a mixture of ethylene carbonate and dimethyl carbonate. Alternatively, other various solvents may be used. Examples of these solvents include polar solvents such as ethylene carbonate, propylene carbonate, dimethyl carbonate, diethyl carbonate, γ-butyrolactone, sulfolane, dimethyl sulfoxide, acetonitrile, dimethylformamide, dimethylacetamide, 1,2-dimethoxyethane, 1,2-diethoxyethane, tetrahydrofuran, 2-methyltetrahydrofuran, dioxolan and methyl acetate, and mixture thereof.

In the batteries (E), (F) and (O) of the present invention, as the lithium salt to be incorporated in the nonaqueous electrolyte solution there was used $LiPF_6$. Alternatively, lithium salts such as $LiBF_4$, $LiAsF_6$, $LiClO_4$, LiSCN, LiI, $LiCF_3SO_3$, LiCl, LiBr and $LiCF_3CO_2$ and mixture thereof may be used.

In the foregoing examples, as the compound capable of intercalating and deintercalating lithium as a positive active material there was used $LiCoO_2$. However, the present invention is not limited to this compound. Alternatively, as an inorganic compound there may be used a compound represented by the composition formula $Li_xMO_2$ or $Li_yM_2O_4$ (in which M represents a transition metal, x represents a number of from more than 0 to not more than 1, and y represents a number of from more than 0 to not more than 2) in the form of composite oxide, oxide having tunnel-like pores or lamellar metal chalcogenide. Specific examples of such an inorganic compound include $LiCoO_2$, $LiNiO_2$, $LiMn_2O_4$, $Li_2Mn_2O_4$, $MnO_2$, $FeO_2$, $V_2O_5$, $V_6O_{13}$, $TiO_2$ and $TiS_2$. Examples of organic compound to be used as the foregoing compound include electro-conductive polymers such as polyaniline. The foregoing active materials may be used in admixture regardless of which they are inorganic or organic.

In the process for the preparation of the batteries of the foregoing examples, as the compound to be used as negative material there was used graphite. Alternatively, an alloy of lithium with Al, Si, Pb, Sn, Cd, etc., composite oxide of transition metal such as $LiFe_2O_3$, oxide of transition metal such as $MoO_2$, carbon-based material such as graphite and carbon, lithium nitride such as $Li_5(Li_3N)$, tin or silicon oxide, lithium foil, or mixture thereof may be used.

As mentioned above, in the present invention, an electrode comprising a current collector made of a metal and an active material layer and holding therein a polymer paste having a polymer dissolved in a solvent soluble in water is treated with an aqueous solution containing an alcohol, phosphorus or phosphorus compound to prepare an electrode for nonaqueous electrolyte battery. In the present invention, it was experimentally confirmed that even if an electrode constituted by a current collector made of a metal is immersed in an aqueous solution, the deterioration of the current collector properties due to the corrosion of metal by water can be remarkably inhibited. Accordingly, the use of the present invention prevents the deterioration of the current collector properties due to the corrosion of the current collector, making it possible to obtain sufficient battery properties, even if an electrode provided with a porous polymer is prepared by a solvent extraction method which involves immersing an electrode in water. Since water, which is inexpensive, can be used as the solvent in which the electrode is immersed in the solvent extraction method, the production cost of the electrode can be reduced as compared with the case where other solvents are used. Thus, the present invention allows the production of a safe high performance nonaqueous electrolyte battery at a low cost.

What is claimed is:

1. A process for producing a nonaqueous electrolyte battery comprising an electrode with porous polymer, comprising the steps of:

preparing an electrode comprising a metal as a current collector and having an active material layer;

preparing a polymer paste having a polymer dissolved in a solvent soluble in water;

allowing said polymer paste to be held in said electrode; and extracting said solvent from said polymer paste with an aqueous solution containing an alcohol to obtain a porous polymer, wherein said alcohol is methanol and the concentration of alcohol in said aqueous solution is from 30 to 60% by weight.

2. A process for producing a nonaqueous electrolyte battery comprising an electrode with porous polymer, comprising the steps of:

preparing an electrode comprising a metal as a current collector and having an active material layer;

preparing a polymer paste having a polymer dissolved in a solvent soluble in water;

allowing said polymer paste to be held in said electrode; and extracting said solvent from said polymer paste with an aqueous solution containing phosphorus or phosphorus compound to obtain a porous polymer.

3. The process for producing a nonaqueous electrolyte battery according to claim 2, wherein said aqueous solution containing a phosphorus compound is an aqueous solution of phosphoric acid or phosphate.

4. The process for producing a nonaqueous electrolyte battery according to claim 2, wherein the concentration of phosphorus or phosphorus compound in said aqueous solution is from $1 \times 10^{-7}$ to 1 mol/l.

5. The process for producing a nonaqueous electrolyte battery according to claim 2, wherein said metallic current collector is made of aluminum or copper.

6. The process for producing a nonaqueous electrolyte battery according to claim 2, wherein said phosphorus or phosphorus compound forms a phosphorus compound film on the surface of said current collector.

7. The process for producing a nonaqueous electrolyte battery according to claim 1, wherein said metallic current collector is made of aluminum or copper.

8. The process for producing a nonaqueous electrolyte battery according to claim 2, wherein said active material layer comprises a transition metal composite oxide.

9. The process for producing a nonaqueous electrolyte battery according to claim 2, wherein said active material layer has pores.

10. The process for producing a nonaqueous electrolyte battery according to claim 9, wherein said polymer paste penetrates into said pores of said active material layer.

* * * * *